(12) United States Patent
He et al.

(10) Patent No.: US 12,211,350 B2
(45) Date of Patent: Jan. 28, 2025

(54) SYSTEM AND METHOD FOR INTERACTIVE ONLINE ENTERTAINMENT

(71) Applicant: SHENZHEN SVAKOM TECHNOLOGY CO., LTD, Shenzhen (CN)

(72) Inventors: Minchao He, Shenzhen (CN); Yong Yu, Shenzhen (CN)

(73) Assignee: SHENZHEN SVAKOM TECHNOLOGY CO., LTD, Shenzhen (CN)

( * ) Notice: Subject to any disclaimer, the term of this patent is extended or adjusted under 35 U.S.C. 154(b) by 689 days.

(21) Appl. No.: 17/460,304

(22) Filed: Aug. 29, 2021

(65) Prior Publication Data

US 2022/0139169 A1    May 5, 2022

Related U.S. Application Data

(63) Continuation-in-part of application No. 17/087,652, filed on Nov. 3, 2020, now Pat. No. 11,134,041.

(51) Int. Cl.
*G07F 17/32* (2006.01)
*A61H 19/00* (2006.01)

(52) U.S. Cl.
CPC ......... *G07F 17/3286* (2013.01); *A61H 19/00* (2013.01); *G07F 17/3223* (2013.01); *G07F 17/3225* (2013.01); *G07F 17/3251* (2013.01); *A61H 2201/0188* (2013.01); *A61H 2201/12* (2013.01); *A61H 2201/5012* (2013.01); *A61H 2201/5041* (2013.01); *A61H 2201/5092* (2013.01); *A61H 2201/5097* (2013.01)

(58) Field of Classification Search
CPC ............ G07F 17/3286; G07F 17/3223; G07F 17/3225; G07F 17/3251; G07F 17/32; A61H 19/00
See application file for complete search history.

(56) References Cited

U.S. PATENT DOCUMENTS

| | | | |
|---|---|---|---|
| 6,409,602 B1 * | 6/2002 | Wiltshire | G07F 17/3288 463/16 |
| 9,762,515 B1 * | 9/2017 | Olivares | G06Q 20/18 |
| 10,004,659 B1 * | 6/2018 | Campbell | A61H 23/00 |
| 10,945,914 B1 * | 3/2021 | Liu | G06Q 20/123 |
| 11,134,041 B1 * | 9/2021 | He | G06Q 20/065 |
| 11,311,453 B2 | 4/2022 | Liu | |
| 2003/0036678 A1 | 2/2003 | Abbassi | |

(Continued)

*Primary Examiner* — Olisa Anwah

(57) ABSTRACT

Disclosed is a system and method for allowing one or more users to interact with models from a distance, for example, by enabling the users to input the models during online video chat sessions, wherein the models can define input parameters and provide at least one interactive interface, receive an interactive result according to the interactive interface to perform predefined acts, via an adult toy, based on the interactive result received. The adult toy can be Wi-Fi or Bluetooth™ enabled to receive commands directly from the server via web browser extension, the website hosting an online video chat session, or connect to an application installed on a device operated by the model, wherein the application communicates with the web browser extension to relay commands to the adult toy therefrom. In some embodiments, the interactive interface provides a finger guessing game, a dice game or a lottery game.

20 Claims, 16 Drawing Sheets

(56) References Cited

U.S. PATENT DOCUMENTS

| | | | | |
|---|---|---|---|---|
| 2009/0099413 A1* | 4/2009 | Kobashikawa | ........ | A61H 19/44 600/38 |
| 2015/0335520 A1* | 11/2015 | Dills | ...................... | A61H 19/30 601/46 |
| 2020/0289363 A1* | 9/2020 | Liu | ........................ | A61H 19/34 |

* cited by examiner

SYSTEM AND METHOD FOR INTERACTIVE ONLINE ENTERTAINMENT

CROSS REFERENCE TO RELATED APPLICATIONS

The present application is a continuation-in-part of a U.S. application Ser. No. 17/087,652, filed on Nov. 3, 2020, and the entire contents of which are hereby incorporated by reference in its entirety.

FIELD

The present invention generally relates to telecommunications. More particularly, the present invention is directed to methods and systems for interactive online adult entertainment.

BACKGROUND

Chat rooms are widely used to allow two or more users usually located at different locations to communicate. Generally, chat rooms utilize text input by the users that can be displayed in real-time for providing a written transcript of a conversation. Some forms of chatting incorporate video and audio so that two or more users can view some or ail of the users from different locations in real-time while conversing.

SUMMARY OF THE INVENTION

In view of the disadvantages inherent in the known types of systems for chat rooms and communication systems now present in the prior art, the present invention provides an improved interactive online communication system for adult entertainment.

The following discloses a simplified summary of the specification in order to provide a basic understanding of some aspects of the specification. This summary is not an extensive overview of the specification. It is intended to neither identify key or critical elements of the specification nor delineate the scope of the specification. Its sole purpose is to disclose some concepts of the specification in a simplified form as to prelude to the more detailed description that is disclosed later.

Some embodiments include, for example, devices, systems, and methods of providing adult entertainment via online chat sessions and interactive shows.

Some embodiments include a system comprising a server with a memory having stored thereon instructions, and a processor to execute the instructions resulting in a web browser extension or an adult video chatting website for allowing users to interact with models from a distance, for example, by tipping the models during an online video chat session on a website, wherein the models can define input parameters and provide at least one interactive interface, receive an interactive result according to the at least one interactive interface to perform predefined acts, via an adult toy or another stimulation device, based on the interactive result received.

In some embodiments, if the input falls within live input parameters, provides the interactive interface and outputs randomly the interactive result from the interactive interface.

In some embodiments, if the input falls within the input parameters, provides a first interactive interface and a second interactive interface, outputs randomly a first result from the first interactive interface, outputs randomly a second result from the second interactive interface, and outputs randomly the interactive result according to the first result and the second result.

In some embodiments, the interactive interface provides a selected one online game from the group of a finger guessing game, a dice game and a lottery game, the interactive result is randomly generated from a plurality of predefined results according to the online game, the adult toy has a plurality of different modes corresponding to the plurality of predefined results.

In some embodiments, the plurality of modes includes a first mode of no actuating, a second mode of actuating for a first tune period at a first actuating speed, a third mode of actuating for a second time period at a second actuating speed, the third mode is different from the second mode, and a fourth mode of actuating for a third time period at the first actuating speed and actuating for a fourth time period at the second actuating speed.

In some embodiments, the input parameters comprise a first range of input value, a second range of input value, and a third range of input value, the input value of the second range are greater than the input value of the first range and less than the input value of the third range, if the tip falls within the input parameters of the first range, the at least one interactive interface provides a first online game from the group of the finger guessing game, the dice game and the lottery game; if the tip falls within said the parameters of the second range, the at least one interactive interface provides a second online game from the group of the finger guessing game, the dice game and the lottery game; and if the input falls within the input parameters of the third range, the at least one interactive interface provides a third online game from the group of the finger guessing game, the dice game and the lottery game.

In some embodiments, in each range of input value, the plurality of predefined results has a plurality of different prizes respectively, and a probability to win a bigger prize from the plurality of different prizes is improved with increase of the input.

In some embodiments, the adult toy is Wi-Fi-enabled or Bluetooth-enabled, the system further includes a model device having an application installed thereon, and the application is configured to send commands to the adult toy to control the adult toy.

In some embodiments, the model device is configured to provide the interactive interface, receive the interactive result from the interactive interface and control the adult toy according to the interactive result.

In some embodiments, the software application includes a link generator for generating a live control link according to the interactive result, the live control link configured to be clicked so as to control the adult toy, further wherein the live control link includes a unique Uniform Resource Locator (URL), the link generator is configured to invalidate previously generated live control link or to build a queue of multiple links.

In the light of the foregoing, these and other objects are accomplished in accordance of the principles of the present invention, wherein the novelty of the present invention will become apparent from the following detailed description and appended claims.

BRIEF DESCRIPTION OF THE DRAWINGS

The above and other objects and advantages of the present invention will be apparent upon consideration of the following detailed description, taken in conjunction with the accompanying exemplary drawings, in which like reference characters refer to like parts throughout, and in which.

DETAILED DESCRIPTION OF THE INVENTION

Figure 1:
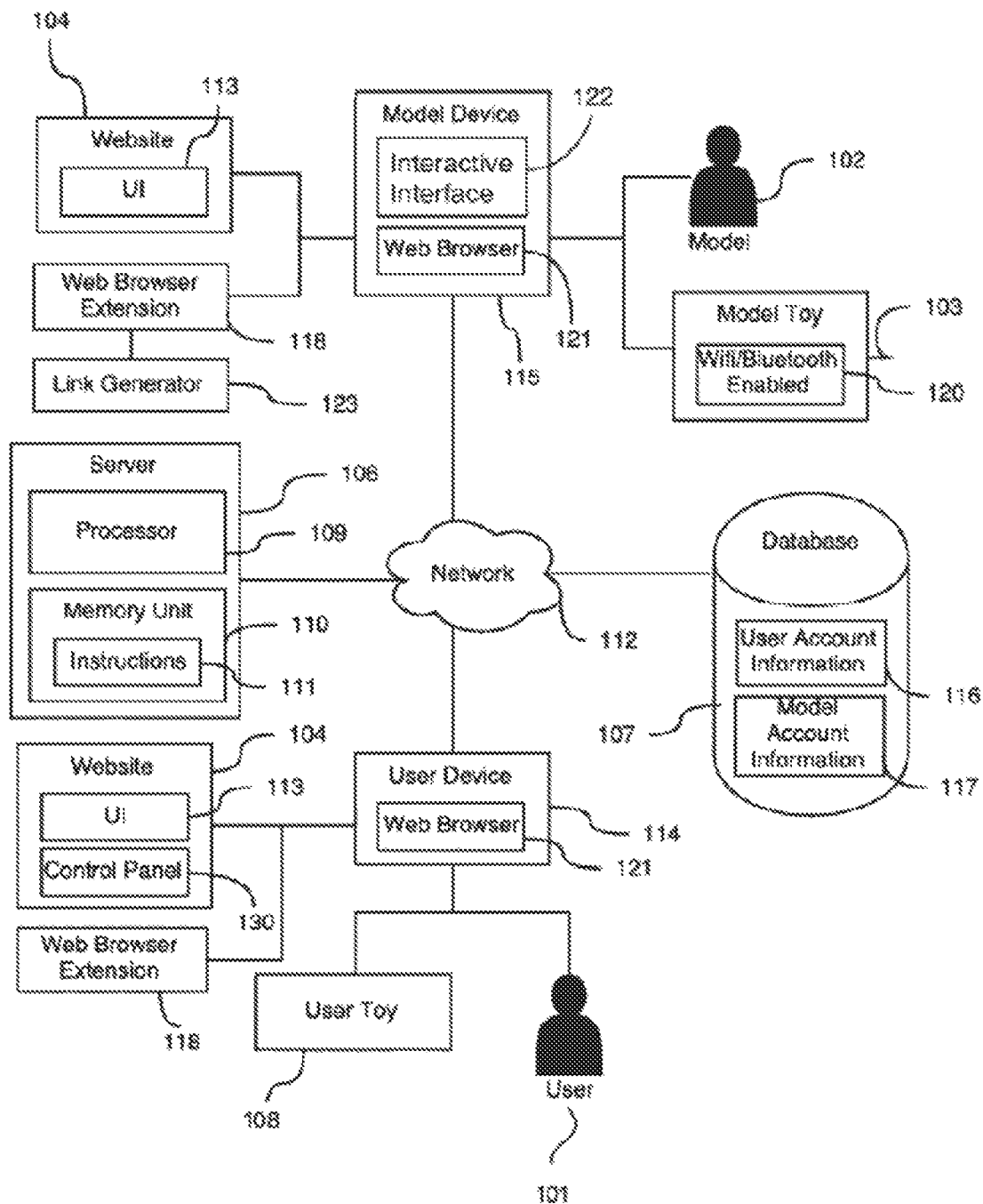
FIGS. 1 through 2 show high-level block diagrams of the present system.

The present invention is directed towards a communication system and method that can actuate adult toys over distances. For purposes of clarity, and not by way of limitation, illustrative views of the present system and method are described with references made to the above-identified figures. Various modifications obvious to one skilled in the art are deemed to be within the spirit and scope of the present invention.

As used in this application, the terms "component," "module," "system," "interface," or the like are generally intended to refer to a computer-related entity, either hardware or a combination of hardware and software. For example, a component can be, but is not limited to being, a process running on a processor, an object, and/or a computer. By way of illustration, both an application running on a controller and the controller can be a component. One or more components can reside within a process and/or thread of execution and a component can be localized on one computer and/or distributed between two or more computers. As another example, an interface cart include I/O components as well as associated processor, application, and/or API components.

It is to be appreciated that determinations or inferences referenced throughout the subject specification can be practiced through the use of artificial intelligence techniques. In this regard, some portions of the following detailed description are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

Furthermore, the claimed subject matter can be implemented as a method, apparatus, or article of manufacture using standard programming anchor engineering techniques to produce software, firmware, hardware, or any combination thereof to control a computer to implement the disclosed subject matter. The term "article of manufacture" as used herein is intended to encompass a computer program accessible from any computer-readable device, or media.

Discussions herein utilizing terms such as, for example, "processing," "computing," "calculating," "determining," "establishing," "identifying," "analyzing," "checking," or the like, may refer to operations(s) and/or process(es) of a computer, a computing platform, a computing system, or other electronic computing device, that manipulate and/or transfer data represented as physical (e.g., electronic) quantities within the computer's registers and/or memories into other data similarly represented as physical quantities within the computer's registers and/or memories or other information storage medium that may store instructions to perform operations and/or processes.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to disclose concepts in a concrete fashion. As used in this application, the term "or" is intended to mean an inclusive "or" rather than an exclusive "or."

Additionally, the articles "a" and "an" as used in this application and the appended claims should generally be construed to mean "one or more" or "at least one" unless specified otherwise or clear from context to be directed to a singular form. Similarly, the terms "plurality" and "a plurality" as used herein includes, for example, "multiple" or "two or more." For example, "a plurality of items" includes two or more items. As used herein, the terms "user," "users," "end user," "end users," "audience," "client," "clients," "customer," and "customers" are interchangeable unless the context clearly suggests otherwise. Similarly, as used herein, the terms "model," "models," "performer," "performers," are used interchangeably unless the context clearly suggests otherwise. The terms "web browser extension," "browser extension," and "website" are used interchangeably unless the context clearly suggests otherwise. Furthermore, the foregoing terms "web browser extension," "browser extension," and "website" may be collectively referred to as "application," "software," or "software application."

Some embodiments of the present invention may include one or more wired or wireless links, may utilize one or more components of wireless communication, may utilize one or more methods or protocols of wireless communication, or the like. Some embodiments may utilize wired communication and/or wireless communication.

Some embodiments may be used in conjunction with various devices and systems, for example, a personal computer (PC), a desktop computer, a mobile computer, a laptop, a tablet computer, a server computer, a handheld device, a personal digital assistant (PDA), a wireless communication device, a smart phone, a non-portable device, a wireless access point (AP), a wired or wireless router, a wired or wireless modem, a wired or wireless network, a local area network (LAN), a wireless LAN (WLAN), a metropolitan area network (MAN), a wireless MAN (WMAN), a wide area network (WAN), a wireless WAN (WWAN), a personal area network (PAN), a wireless PAN (WPAN), or networks operating in accordance with existing and/or future versions and/or derivatives of long term evolution (LTE), a device which incorporates a global positioning system (GPS) receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, or the like.

Figure 2:
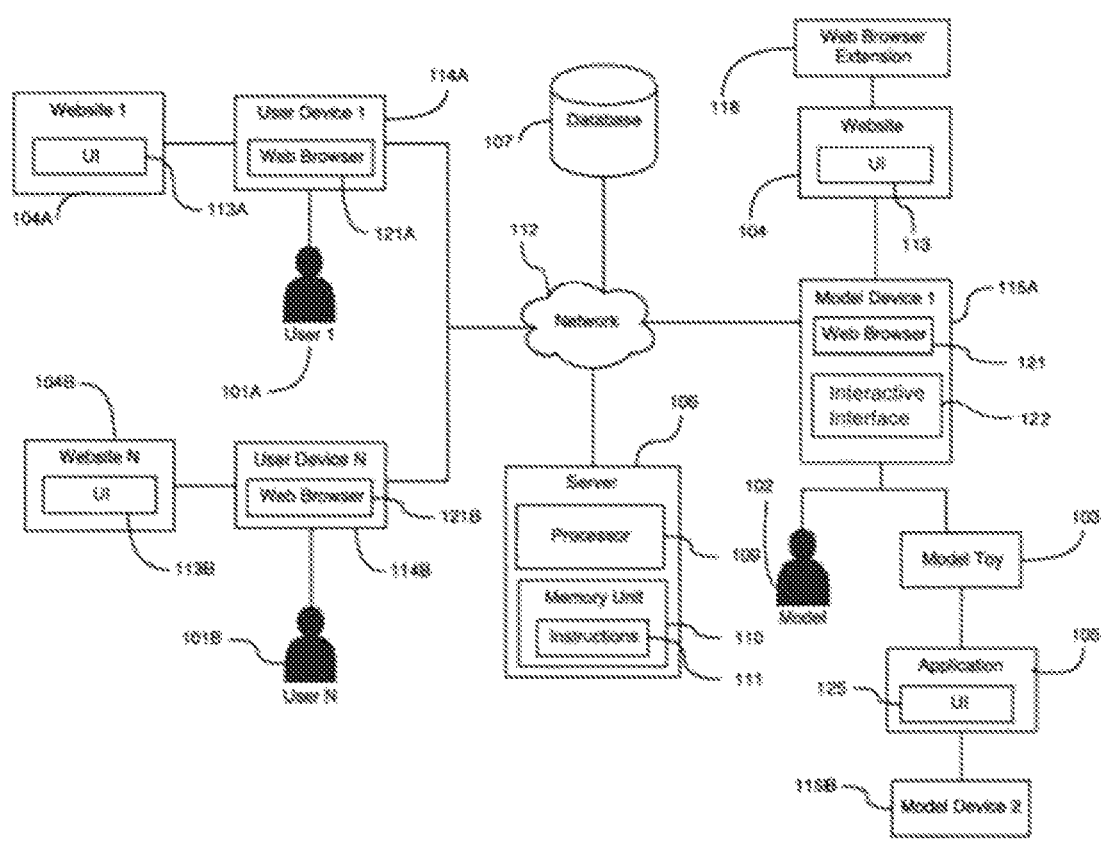

Referring now to FIGS. 1 and 2, there are shown high-level block diagrams of the present system in accordance with some embodiments of the present invention. In one embodiment, the present invention includes a user device 114 that is operated by a user 101, wherein the user device 114 includes a wide variety of computer systems and or a terminal that allow the user 101 to access a web browser 121 on which the user 101 can access a website 104 to engage in an online chat with a model 102 via a user interface (UI) 113 of the website 104. In this regard, the device 114 may be implemented using suitable hardware components and/or software components, for example, processors, controllers, memory units, storage units, input units, output units, communication units, operating systems, applications, or the like.

The present system further includes a model device 115 that is operated by a model 102. The model device 115 also includes a variety of computer systems and/or a terminal that allow the model 102 to access a web browser 121 on which the model 102 can access the website 104 to engage in an online chat with the user 101 via a UI 113 of the website 104. In this regard, the device 114 may be implemented using suitable hardware components and/or software components, for example, processors, controllers, memory units, storage units, input units, output units, communication units, operating systems, applications, or the like.

In some embodiments, the model device 115 includes an application 105 (e.g., non-downloadable or downloadable mobile application, web application, mobile application) stored thereon. Alternatively, the model 102 includes a second model device 115 B having the application 105 installed thereon. The application 105 communicates with the model toy 103 so as to send data thereto (FIG. 2), wherein the model toy 103 includes various types of adult toys and stimulation devices. It is contemplated that the application 105 includes a UI 125 for manually controlling the model toy 103, for example, by transmitting signals to turn the model toy 103 on and off and vibrate the model toy 103. In other embodiments, however, it is contemplated that the model toy 103 is Wi-Fi or Bluetooth™ enabled 120 (or enabled via other suitable short-range wireless interconnection) so as to allow the model toy 103 to directly communicate with the web browser 121 via the model device 115 (FIG. 1) and receive commands therefrom without the application 105 when the model toy 103 is turned on. In this regard, the model toy 103 is configured to receive signals from the model device 115 and/or the web browser 121. In some embodiments, the system further includes a user toy 108 (i.e., Wi-Fi-enabled or Bluetooth™ enabled) that can communicate with the web browser extension 118 of the web browser 121 on the user device 114. It is contemplated that the user toy 108 operates similarly to the model toy 103.

Figure 3:
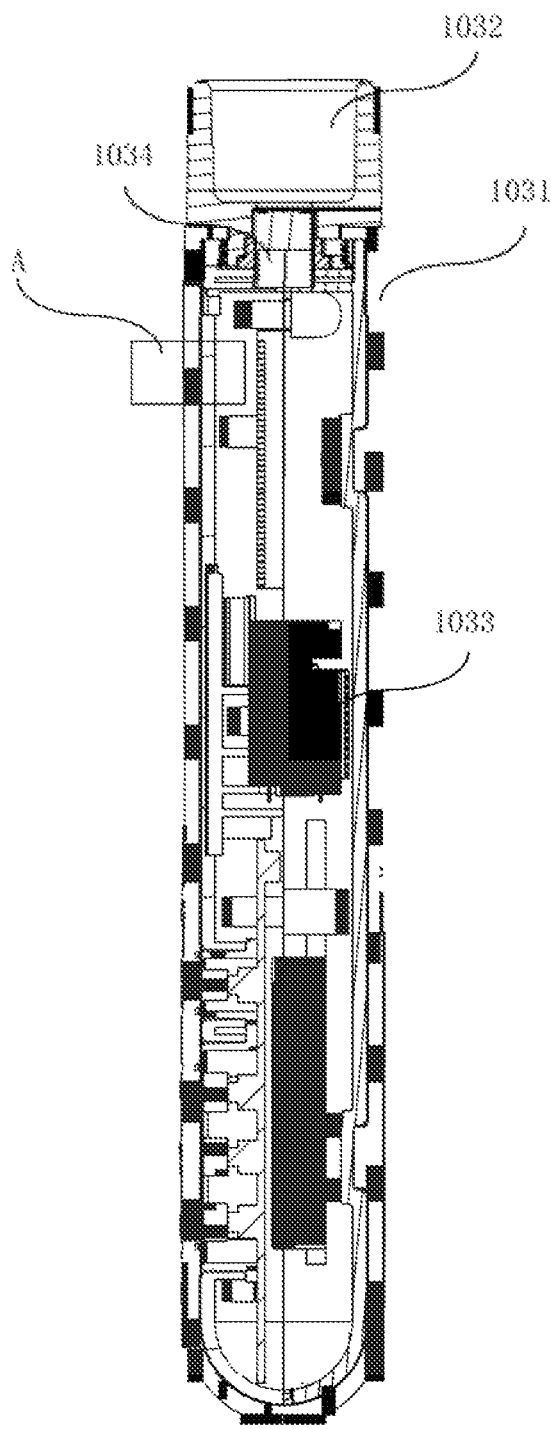
FIG. 3 show s a cross-sectional view of a vibrator according to an embodiment of the present disclosure.
Figure 4:
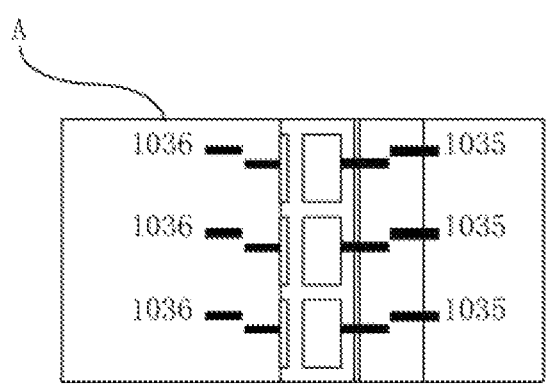
FIG. 4 shows an enlarged view of a portion A of the vibrator of FIG. 3.

In at least one embodiment, the model toy 103 is an adult toy 103 including a case 1031, a lens 1032, a moving member 1033, a camera module 1034, one or more sensors 1035, and a light-emitting member 1036. For example, in at least one embodiment, the adult toy 103 is a vibrator having a transparent front end. The camera module 1034 is arranged inside the transparent front end. The moving member 1033 can be a driving mechanism configured to drive the case 1031 to vibrate. When the model 102 is putting on the vibrator (for example, inserting the vibrator into the vagina) for live streaming, if the user 101 rewards the model 102, a mini game APP (such as rock-paper-scissors, shaker, lottery, etc.) installed in user's mobile phone is activated. According to a result of the mini game APP, the camera module 1034 inside the vibrator is switched on so that the user 101 can view the inside of the vagina. The length of time during which the camera module 1034 is switched on depends on the mount of rewards. The sensors 1035 can be a capacitive sensor or a pressure sensor which can collect motion signals of a human body and feed back the motion signals via Wi-Fi or Bluetooth™. The light-emitting member 1036 can be a monochrome LED or a color LED, which is used to indicate a working state, an intensity, etc. of the adult toy 103, so that the user can obtain the working state and the intensity of the adult toy 103 through the light-emitting member 1036 when the model puts on the adult toy 103 for live streaming. Referring to FIG. 3, a cross-sectional view of the vibrator according to an embodiment of the present disclosure is shown. The case 1031 of the vibrator has a hollow chamber. The lens 1032 is arranged at the front end and the camera module 1034 is arranged inside the hollow chamber, so that the camera module 1034 can take photos of the front end of the vibrator through the lens 1032. The moving member 1033 is arranged inside the hollow chamber and configured to drive the vibrator to vibrate. Referring to FIG. 4, an enlarged view of a portion "A" of the vibrator according to an embodiment of the present disclosure is shown. The one or more sensors 1035 and the light-emitting member 1036 are provided on the case 1031. The one or more sensors 1035 obtain motion signals of the adult toy 103 and control light frequencies of the light-emitting member 1036 according to the motion signals. Preferably, the light-emitting member 1036 is provided on an outer surface of the case 1031, while the one or more sensors 1035 are provided inside the hollow chamber. For example, the light-emitting member 1036 is a monochrome LED. When the adult toy 103 does not vibrate, the monochrome LED does not emit light, when the adult toy 103 vibrate in a lower frequency, the monochrome LED flashes in a lower frequency; when the adult toy 103 vibrate in a higher frequency, the monochrome LED flashes in a higher frequency. Therefore, the user can obtain work states of the adult toy 103 through the monochrome LED.

In at least one embodiment, one or more users 101 can video interact with the model 102 to improve live interaction effect by adding a camera module for the model 102 and a camera module for each of the one or more users 101. When a user 101 rewards the model 102 to activate a mini game APP (such as rock-paper-scissors, shaker, lottery, etc.) installed in user's mobile phone, the camera module for the user 101 is switched on/off, so that the user 101 can video interact with the model 102. The reward manner may include single user reward and multiple user reward. The model 102 can define the reward manner and mount of reward. In at least one embodiment, before the camera module for the user 101 is switched on, the model 102 can confirm whether the user wants to switch on the camera module for the user by a pop-up window, or directly switch on the camera module for the user without confirmation. In detail, the single user reward and the multiple user reward can be:

Single user reward: take the dice game for example, it can be defined that if the number of the dice is an odd number, the camera module for the user 101 is switched on; if the number of the dice is an even number, the camera module for the user 101 is switched off. The model 102 shakes the dice. If the number of the dice is 1, the camera module for the user 101 is switched on so that the user 101 can video interact with the model 102. At the same time, other users 101 can view the user 101. During the video interaction, the model 102 can put on the adult toy 103 for live streaming.

Multiple user reward 1: The model 102 defines the reward manner to be multiple user reward. Multiple users can be numbered according to the numbers of the dice. If the number of the users 101 is not greater than 6, the users 101 can be numbered with 1-6 according to a reward order in which the users reward the model 102. If the number of the users 101 is greater than 6, the first six of the users 101 can be numbered with 1-6 according to the reward order and the rest of the users 101 can be numbered with another 1-6, and so on. The model 102 shakes the dice and the camera module for the user can be switched on for video interaction according to the result of the dice. For example, if the number of the dice is 1, the camera module for the user 101 with corresponding number is switched on.

Multiple user reward 2: The model 102 defines the reward manner to be multiple user reward, if the number of the dice is an odd number, the camera module for the user 101 is switched on; if the number of the dice is an even number, the camera module for the user 101 is switched off. Each of the users shakes the dice respectively, the model 102 selects one or more users 101 for video interaction according to the result of each user's dice. For example, multiple users 101 shake the dice respectively, if the result of the dice for one or more of the multiple users is 1, the camera module for the one or more of the multiple users is switched on.

The website 104 is configured to allow the user 101 and the model 102 to set up a user account and a model account, respectively. In this regard, the user 101 can create his or her user name and password and input payment information, among other types of information associated with the user. Similarly, the model 102 can create a model account by inputting the model's name, age, gender, location, and the like. The user account information 116 and the model account information 117 are stored in a database 107 that is connected to the network 112 of the present system.

The user 101 can select a model 102 from a group of models to enter into an online chat session, via the website 104. In this regard, the chat session can be a private (i.e., one-on-one) session, a group session (i.e., limited number of users and one model), or a public session (i.e., unlimited number of users). Each model 102 can define and edit input parameters that am used during each chat session. In one embodiment, the website 104 allows the model to designate specific input value and/or ranges of input value and designate to enter an interactive interface when tip from the user 101 falls within input value and/or ranges of input value. In this regard, the website 104 is configured to recognize input value and send an interactive command to the model device 115 such that the model device 115 provides an interactive interface 122, receives an interactive result from the interactive interface 122 and controls the adult toy 103 actuate according to the interactive result. In another embodiment, the website 104 can be configured to recognize input value and provide an interactive interface, receive an interactive result from the interactive interface and control the adult toy 103 actuate according to the interactive result via the model device 115.

In the embodiment, the input may be a tip from users. The input value may be the tip amounts, and the input parameters may be the tip parameters.

Figure 5:
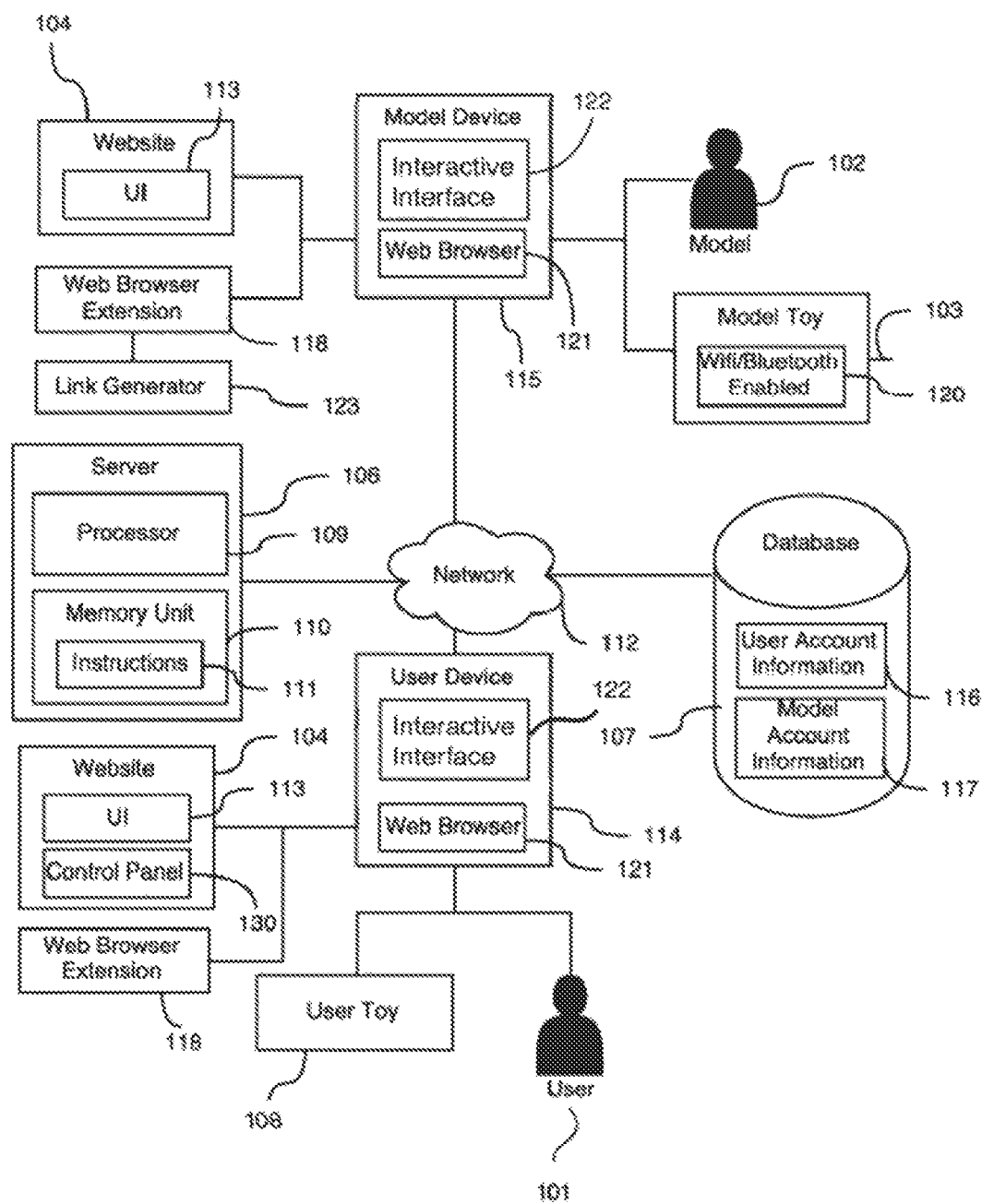
FIG. 5 shows a block diagram of the present system according to another embodiment of the present disclosure.

Referring to FIG. 5, in other embodiment, the website 104 is configured to recognize input value and send an interactive command to the model device 115 and the user device 114 such that the model device 115 provides a first interactive interface 122 and the user device 114 provides a second interactive interlace 122. Further, the model device 115 outputs a first result from the first interactive interface 122, the user device 114 outputs a second result from the second interactive interface 122, the website 104 outputs randomly an interactive result according to the first result and the second result, and controls the adult toy 103 actuate according to the interactive result.

It can be understood, the website 104 determines whether the input from the user 101 falls within the one or more ranges, if the input falls within the one or more ranges of the input parameters, the interactive interface 122 is provided, and if the input does not fall within the one or more ranges of the input parameters, the interactive interface is not provided. In addition, the interactive result from the interactive interface may be generated from a click operation or a touch operation on the interactive interface by the model 102. For example, the ranges of up parameters may be defined as a first range of tip amounts 1~10 tokens, a second range of tip amounts 11~20 tokens, a third range of tip amounts 21~30 tokens, and a fourth range of tip amounts greater than 31 tokens.

Figure 6:
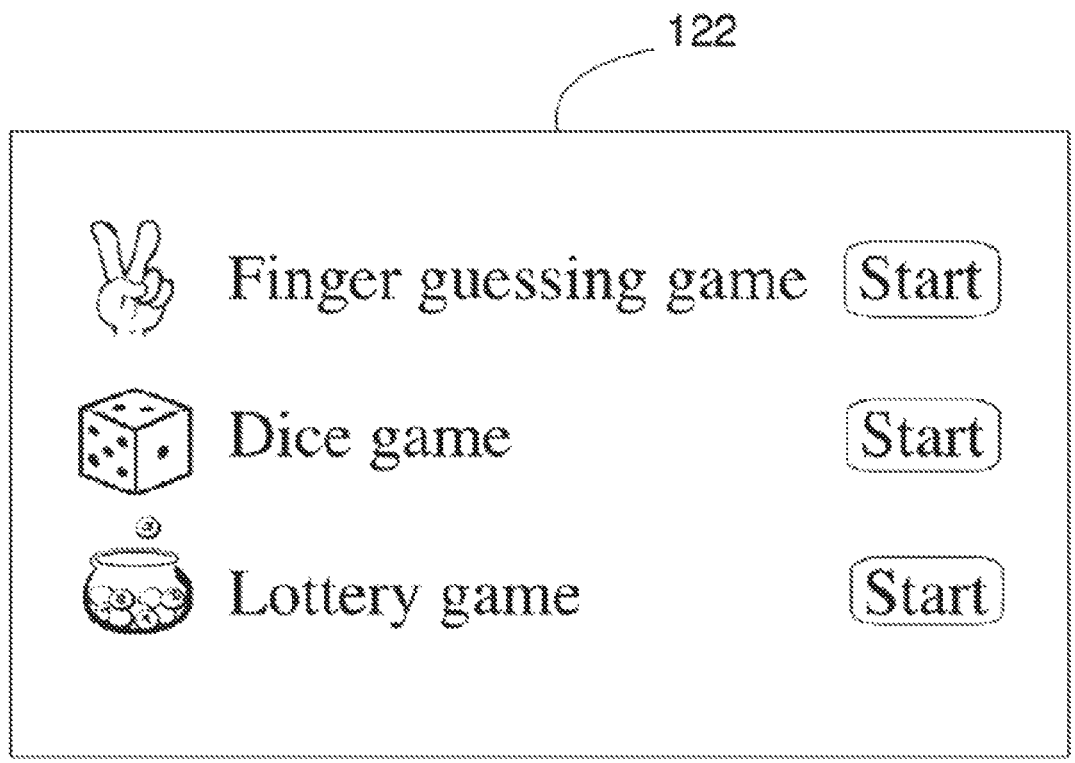
FIG. 6 shows an interactive interface provided by the present system.

Referring to FIG. 6, in some embodiments, the interactive interface provides a selected one online game from the group of a finger guessing game, a dice game and a lottery game. The interactive result can be randomly generated from a plurality of predefined results according to the online game. The adult toy 103 has a plurality of different modes corresponding to the plurality of predefined results. The plurality of modes includes a first mode of no actuating, a second mode of actuating for a first time period at a first actuating speed, a third mode of actuating for a second time period at a second actuating speed, the third mode is different from the second mode and a fourth mode of actuating for a third time period at the first actuating speed and actuating for a fourth time period at the second actuating speed. In one embodiment, the first time period is 5 seconds, the second time period is 5 seconds, the third time period is 10 seconds, and the fourth time period is 10 seconds. The first actuating speed can be less than the second actuating speed.

In one embodiment, the interactive interface provides a finger guessing game, predefined results may include "Rock", "Paper", and "Scissors". If the interactive result is "Scissors", the corresponding mode is the second mode, the model device 115 controls the adult toy 103 actuate for the first time period in the first actuating speed. If the interactive result is "Rock", the corresponding mode is the third mode, the model device 115 controls the adult toy 103 actuate for the first time period in the second actuating speed. If the interactive result is Paper, the corresponding mode is the fourth mode, the model device 115 controls the adult toy 103 actuate for the third time period at the first actuating speed and actuating for the fourth time period at the second actuating speed. In addition, the interactive result may be circularly selected from the predefined results with the order of "Rock", "Paper", and "Scissors" or the predefined results with the order of "Scissors", "Rock", and "Paper". Alternatively, the interactive result also can be randomly selected from the predefined results of "Rock", "Paper", and "Scissors" by invoking a random function.

In one embodiment, the interactive interface provides a dice game, the predefined results may include numbers 1-6. If the interactive result is number 1, the corresponding mode is the first mode, the model device 115 controls the adult toy 103 no actuating. If the interactive result is number 2, the corresponding mode is the second mode, the model device 115 controls the adult toy 103 actuate for the first time period in the first actuating speed. If the interactive result is number 3, the corresponding mode is the third mode, the model device 115 controls the adult toy 103 actuate for the first time period in the second actuating speed. If the interactive result is number 6, the corresponding mode is the fourth mode, the model device 115 controls the adult toy 103 actuate for the third time period at the first actuating speed and actuating for the fourth time period at the second actuating speed. In addition, the interactive result may be circularly selected from the predefined results with the order of number 1, number 5, number 3, number 4, number 6, and number 2. Alternatively, the interactive result also can be randomly selected from the predefined results of numbers 1~6 by invoking a random function.

In one embodiment, the interactive interface provides a lottery game, the predefined results may include grand prize, first prize, second prize, third prize and no prize. If the interactive result is no prize, the corresponding mode is the first mode, the model device 115 controls the adult toy 103 no actuating. If the interactive result is the second prize, the corresponding mode is the second mode, the model device 115 controls the adult toy 103 actuate for the first time period in the first actuating speed. If the interactive result is the first prize, the corresponding mode is the third mode, the model device 115 controls the adult toy 103 actuate for the first time period in the second actuating speed. If the interactive result is the grand prize, the corresponding mode is the fourth mode, the model device 115 controls the adult toy 103 actuate for the third time period at the first actuating speed and actuating for the fourth time period at the second actuating speed. In addition, the interactive result may be circularly selected from the predefined results with the order of the third prize, no prize, the second prize, the third prize, the grand prize, and the first prize. Alternatively, the interactive result also can be randomly selected from the predefined results of grand prize, first prize, second prize, third prize and no prize by invoking a random function.

As previously mentioned, the ranges of tip parameters may be defined as a first range of tip amounts 1~10 tokens, a second range of tip amounts 11~20 tokens, a third range of tip amounts 21~30 tokens, and a fourth range of tip amounts greater than 31 tokens. The tip amounts of the second range are greater than the tip amounts of the first range and less than the tip amounts of the third range, and the tip amounts of the fourth range are greater that the tip amounts of the third range. In one embodiment, if said tip falls within said tip parameters of the first range, the at least one interactive interface provides a first online game from the group of the finger guessing game, the dice game and the lottery game; if said tip falls within said tip parameters of the second range, the at least one interactive interface provides a second online game from the group of the finger guessing game, the dice game and the lottery game; and if said tip falls within said tip parameters of the third range, the at least one interactive interface provides a third online game from the group of the finger guessing game, the dice game and the lottery game.

For example, if said tip falls within said tip parameters of the first range, the at least one interactive interface provides the finger guessing game; if said tip falls within said tip parameters of the second range, the at least one interactive interface provides the dice game; and if said tip falls within said tip parameters of the third range, the at least one interactive interface provides the lottery game.

Furthermore, in each range of tip amounts, a probability to win a bigger prize from the plurality of different prizes is improved with increase of the tip from the user 101.

In the finger guessing game, if a first tip from the user 101 falls within the first range of tip amounts 1~10 tokens and a second tip from the user 101 greater than the first tip falls within the first range of tip amounts 1~10 tokens, a probability to win a bigger prize (such as a predefined results "Paper") of the second tip is greater than a probability to win a bigger prize (such as a predefined results "Paper") of the first tip, such as a probability to receive a predefined results "Paper" of the second tip may be 50% and a probability to receive a predefined results "Paper" of the first tip may be 20%, a probability to win another predefined res tilts except "Paper" of the second tip may be 50% and a probability to win another predefined results except "Paper" of the first tip may be 80%. It can be understood, in one embodiment, the second tip and the first tip may corresponds to different predefined results, such as the predefined results corresponding to the second tip may be "Paper", "Rock", "Paper", and "Scissors", and the predefined results corresponding to the first tip may be "Paper", "Rock", "Scissors", "Rock" and "Scissors".

In the dice game, if a first tip from the user 101 falls within the first range of tip amounts 1~10 tokens and a second tip from the user 105 greater than the first tip falls within the first range of tip amounts 1~10 tokens, a probability to win a bigger prize (such as a predefined results of number 6) of the second tip is greater than a probability to win a bigger prize (such as a predefined results of number 6) of the first tip, such as a probability to receive the predefined results of number 6 of the second tip may be 50% and a probability to receive the predefined results of number 6 of the first tip may be 20%, a probability to win another predefined results except "number 6" of the second tip may be 50% and a probability to win another predefined results except "number 6" of the first tip may be 80%. It can be understood, in one embodiment, the second tip and the first tip may corresponds to different predefined results, such as the predefined results corresponding to the second tip may be "number 6", "number 1", "number 6", "number 2" "number 6" and "number 3", and the predefined results corresponding to the first tip may be "number 6", "number 1", "number 2", "number 3", and "number 4".

For example, in the lottery game, if a first tip from the user 101 falls within the first range of tip amounts 1~10 tokens and a second tip from the user 101 greater than the first up falls within the first range of tip amounts 1~10 tokens, a probability to win a bigger prize of the second tip is greater than a probability to win a bigger prize of the first tip, such as a probability to win the grand prize of the second tip may be 50% and a probability to win the grand prize of the first tip may be 20%, a probability to win another prize except the grand prize of the second tip may be 50% and a probability to win another prize except the grand prize of the first tip may be 80%. It can be understood, in one embodiment, the second tip and the first tip may corresponds to different predefined results, such as the predefined results corresponding to the second tip may be "grand prize", "first prize", "grand prize", "second prize", "grand prize" "third prize", "grand prize" and "no prize", and the predefined results corresponding to the first tip may be "grand prize", "first prize", "second prize", "third prize", "no prize" and "third prize".

Referring to FIG. 5 and FIG. 6, the website 104 is configured to recognize tip amounts and send an interactive command to the model device 115 and the user device 114 such that the model device 115 provides the first interactive interface 122 and the user device 114 provides the second interactive interface 122. The first interactive interface 122 and the second interactive interface 122 provide the same online game, such as the finger guessing game, the dice game and the lottery game. Further, the model device 115 outputs the first result from the first interactive interface 122, the user device 314 outputs the second result from the second interactive interface 122, the website 104 outputs randomly the interactive result according to the first result and the second result, and controls the adult toy 103 actuate according to the interactive result. For example, in the finger guessing game, if the first result is "Rock" and the second result is "Paper" the website 104 outputs the interactive result of "Paper" and controls the adult toy 103 actuate according to the interactive result of "Paper". If the first result is "Scissor" and the second result is "Paper" the website 104 outputs the interactive result of "Scissor", controls the adult toy 103 to move according to the interactive result of "Scissor", obtains motion signals of the adult toy 103 and feeds back the motion signals.

It is noted that as used herein, the terms "actuate" mean the model's performances, the model's use of the model toy 103 and/or the operation of the model toy 103 (e.g., vibrating, rotating, thrusting, oscillating, stretching, electric current stimulating, a combination of at least two performances from vibrating, rotating, thrusting, oscillating, stretching, electric current stimulating etc.).

After the interactive result is outputted through the interactive interface, the website 104 receives the interactive result from the interactive interface and activates an interaction between the model device 115 and the user device 114 providing the interactive interface.

The interaction can include: obtaining first motion signals of the adult toy 103 from the model device 115 and second motion signals of the user toy 108 from the user device 114; controlling the user toy 108 to move according to the first motion signals; and controlling the adult toy 103 to move according to the second motion signals.

An exemplary embodiment is: the user 101 putting on the user toy 109 plays games with the model 102 putting on the adult toy 103. For example, the user 101 puts on a masturbation cup, while the model 102 puts on a vibrator. The vibrator is provided with one or more first sensors, through which motion signals of the adult toy 103 are obtained. The musturbation cup is provided with one or more second sensors, through which motion signals of the user toy 108 are obtained.

Taking a fighting game as an example, the user 101 and the model 102 perform actions of virtual characters through the musturbation cup and the vibrator respectively. The faster the user 101 inserts into the musturbation cup, the faster the punch/strike speed of the virtual character performed by the user. At this time, if the virtual character performed by the model 102 is hit, the vibrator will generate corresponding vibration to stimulate the model 102; on the contrary, the model 102 can also perform the virtual character to fight back. According to the game result, the user 101 or the model 102 is punished accordingly, such as strong vibration for 10 seconds.

The UI 113 of the website 104 is an interface between the user 101 and one or more elements of the present system (e.g., the website 104), the web browser extension 118, or between the model 102 and one or more elements of the present system. In this regard, the UI 113 of the website 104 allows the user 101 and the model 102 to input and receive messages in a textual format so as to have a live conversation with each other (e.g., in an online chat room). Additionally, the website 104 is further configured to provide a UI 113 comprising audio and video (i.e., during an online video chat session) so that the user 101 can view and listen to the model 102 during a chat session. In some embodiments, the present invention may include other downloadable and/or a non-downloadable software application (e.g., a web application, a mobile application) in lieu of the website 104.

The server 106 includes a memory unit 110 having instructions 111 stored thereon, and a processor 109, wherein the processor 109 is configured to execute the instructions 111 resulting in a software such as the web browser extension 118 or the website 104, wherein the web browser extension 118 or the website 104 is configured to scan for tips during chat sessions and receive tips from the user 101. The web browser extension 118 or the website 104 can determine whether the received tip falls within one of the up parameters defined by the model 102 and whether the interactive interface is provided.

It is contemplated that the user 101 can purchase credits, points, or other types of virtual currency such as tokens that can be credited to his or her account 116 and use the virtual currency to tip the model 102.

If the web browser extension 118 or the website 104 determines that the received tip falls within one of the input parameters, it provides the interactive interface, receives the interactive result from the interactive interface and controls the adult toy 103 actuate according to the interactive result. Alternatively, if the web browser extension 118 or the website 104 determines dun the received tip falls within one of the input parameters, it signals the application 105 to provide the interactive interface, receive the interactive result from the interactive interface and control the adult toy 103 actuate according to the interactive result. It is contemplated that the received input value are credited to the model's account 117 and made redeemable by the respective model at a later time. If the web browser extension 118 determines that the received tip does not fall into any of the input parameters, the web browser extension 118 may be configured to send a notification to the user 101 indicating that the tip amount is insufficient.

In some embodiments, the web browser extension 118 or the website 104 includes a link generator 123 for generating live control links according to the interactive result and transmitting the links to users 301 that are designated by the model 102. The live control link is configured to be clicked so as to control the adult toy 103. It is contemplated that the link generator 123 includes a button that can be clicked, tapped, or otherwise activated to automatically generate new live control links, via the server 106, and cancel previously generated live control links. The model 102 can set parameters to define the duration for which the model 102 would permit the user 102 to control the model toy 103. In this way, the live control links allow certain users 101 to control the model toy 103 for a limited or an unlimited time, wherein the users 101 can control the model toy 103 via a virtual control panel 130 that is accessible when the live control link is used. The live control link may be available to the user 101 while the user 101 is in a chat session. If more than one user 101 receives a live control link, then the web browser extension 118 or the website 104 creates a queue to add additional links, for example, in the order accessed.

In other embodiments, the model device 115 can be configured to provide a remote control request to the user device 114 according to the interactive result such that the user device 114 provides a remote control signal to control the adult toy 103 via the model device 115. It can be understood, the remote control request may be generated by a first application installed on the model device 115, the remote control request may be received by a second application installed on the model device 115, and the second application may provide the remote control signal to the first application so as to control the adult toy 103 via the model device 115.

Some embodiments of the present system include two or more users 101 A, 101 B in communication with one model 102 at the same time, wherein each of the users 101 A, 101 B operates a user device 121 A, 121 B for accessing the website 104 A, 104 B via the web browser 121 A, 121 B. In this regard, the first user 101 A and the second user 101 B can use different web browsers so that the first web browser 121 A and the second web browser 121 B need not be the same. Additionally, each user 101 A, 101 B can visit different websites to enter into an online chat session with the model 102 such that the first website 104 A and the second web site 104 B need not be the same.

In this regard, the model 102 can broadcast on multiple platforms simultaneously (referred hereto as "split-camming") so that each user 101 A, 101 B can view the model via, for example, UI 113 A, 113 B, and up the model 102. One model and two or more users 101 A, 101 B can be in a single chat session. When multiple users 101 A, 101 B tip the model 102, the web browser extension 118 or the website 104 can form a queue and build on the interactive results received. For example, the model toy 103 can react to a first interactive result received, and then react to a second interactive result received, wherein the first interactive result is received before the second interactive result. If the first user 101 A tips and corresponds to the first interactive result and the second user 101 B tips and corresponds to the second interactive result, then the each of the users may be notified when the model toy 103 is reacting to their respective interactive results. Alternatively, one model 102 can be in multiple chat sessions with individual users 101 A, 101 B (i.e., one chat session per user). In this regard, the web browser extension 118 can scan all of the websites 104 A, 104 B simultaneously for interactive results to actuate the model toy 103 or to signal the application 105 to make the model toy 103 react based on the received interactive results.

In some embodiments, one user 101 may enter into multiple chat sessions with multiple models simultaneously. In this regard, the web browser extension 118 for each model 102 can scan for interactive results designated for that model 102 and actuate the model toy 105 belonging to the respective model 102, or signal the model's application 105 to actuate the model toy 103.

Reference is also made to FIGS. 7~10, which schematically illustrates exemplary methods of interactive online communication for adult entertainment. In some embodiments, one or more of the operations of FIGS. 7 through 10 may be performed by one or more elements of the system (e.g., web browser extension 118 (FIGS. 1, 2 and 5)).

Figure 7:
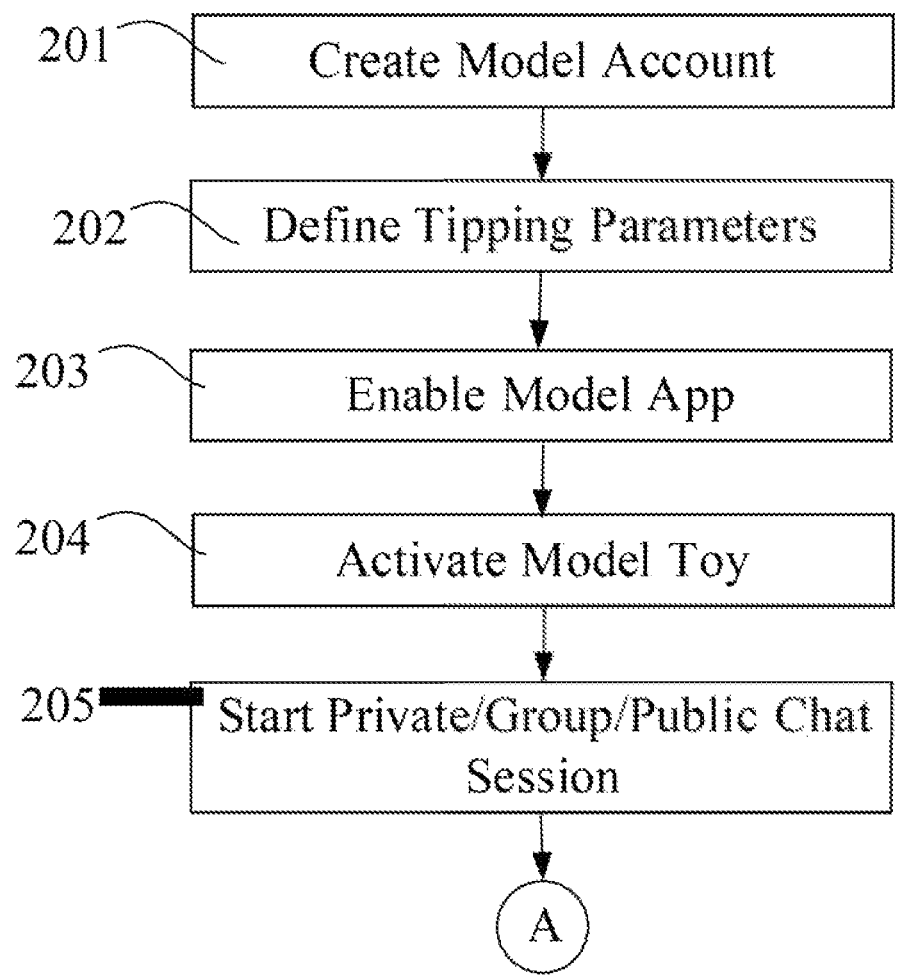
FIGS. 7 through 10 show exemplary flow charts of the present method.
Figure 8:
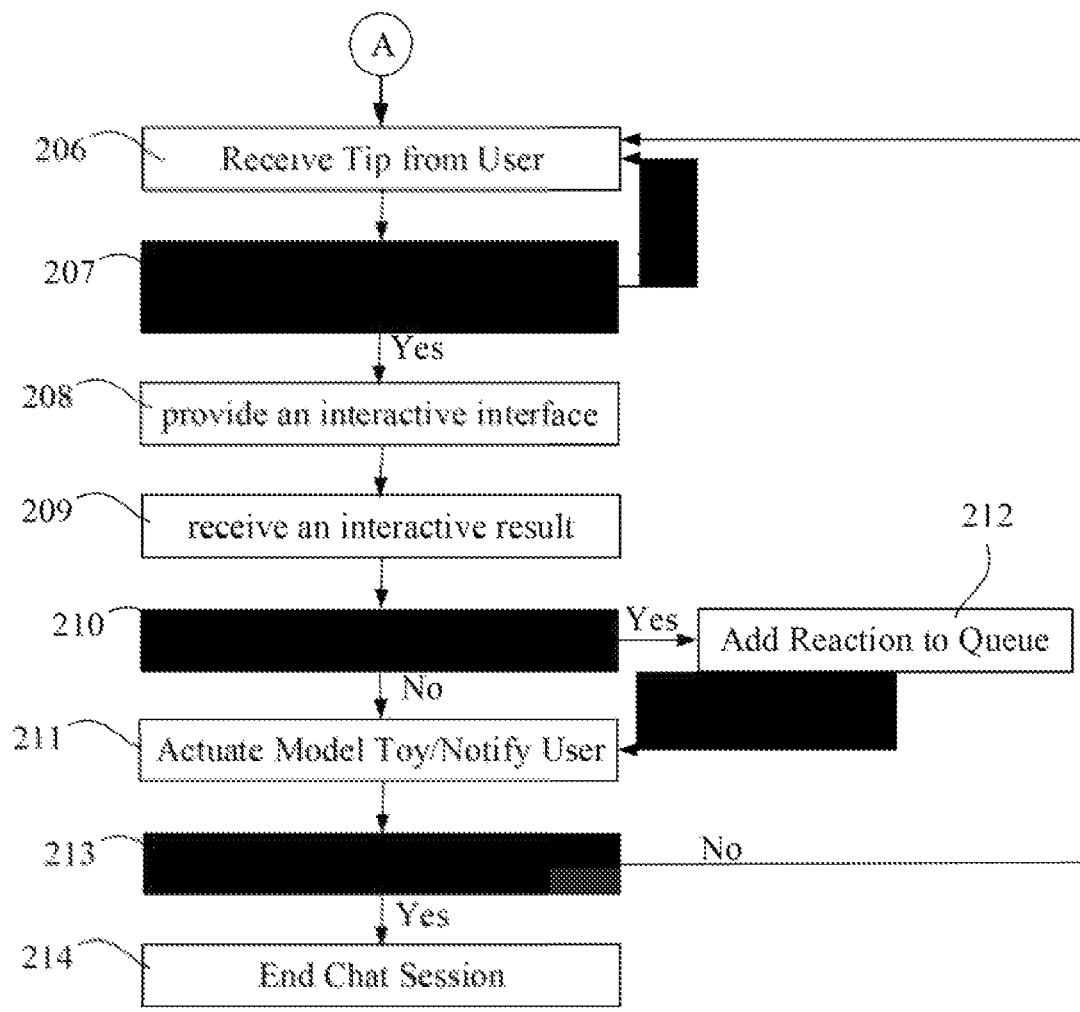

One embodiment for the present method in operation is illustrated in FIGS. 7 and 8. As indicated in block 201, the method may include creating a model account via a website 104 (FIGS. 1, 2 and 5), wherein the model account includes information associated with the model such as the model's name, age, gender, location, and the like. As indicated in block 202, the method may include defining tipping parameters via the website 104 or the web browser extension 118 (FIGS. 1, 2 and 5), wherein the tipping parameters can be determined by the model such that the parameters can vary from a model to a model, and wherein the tipping parameters include specific input value or one or more ranges of input value and acts corresponding thereto.

Optionally, as indicated in block 203, the model can enable the application 105 (FIG. 2) stored on the model device 115 (FIGS. 1, 2 and 5), if the model toy 103 (FIGS. 1, 2 and 5) is not Wi-Fi-enabled. The application 105 (FIG. 2) can activate the model toy 204 before the model enters into a chat session with a user. If the model toy is Wi-Fi-enabled 120 (FIGS. 1, 2 and 5), the application 105 (FIG. 2) may not be needed and the model toy 103 (FIGS. 1, 2 and 5) can be activated 204 via a control button (i.e., a power switch or button) disposed on the model toy 103 (FIGS. 1, 2 and 5).

As indicated in block 205, the model can start a chat session (i.e., a private session, a group session, or a public session) with a client via any online chat platform, including a third party platform. The model can receive tips from a client 206 during a chat session. When the model receives a tip, the web browser extension 118 or the website 104 (FIGS. 1, 2 and 5) determines whether the tip is within the model's input parameters 207. As indicated in blocks 208 and 209, if the tip amount received falls within one of the input parameters, an interactive interface is provided and an interactive result is received, the web browser extension 118 (FIGS. 1, 2 and 5) further determines whether there is an existing queue 210. If there is no existing queue, the model toy is actuated 211 via the application 105 (FIG. 2) of the model device 115 (FIGS. 1, 2 and 5) according to the interactive result. Alternatively, the web browser extension 118 (FIG. 1) may be configured to directly actuate the Wi-Fi-enabled 120 (FIG. 1) model toy 103 (FIG. 1). If there is a queue, the reaction corresponding to the interactive result is added to the queue 212, wherein the reaction is added in order received.

In some embodiments, if the tip does not fall within any of the input parameters or meet a specific tip amount, the web browser extension 118 (FIGS. 1, 2 and 5) can notify the user to indicate that the tip did not fall within the model's input parameters and that the user needs to adjust (i.e., increase) the tip amount. Alternatively, no interactive surfaces are taken if the tip amount does not fall within any of the tip parameter. The user can continue tipping the model until the chat session ends.

As indicated in block 213, if the model indicates that it is the end of a chat session, the chat session is ended 214. The user may or may not be able to end the chat session. For instance, the user may be able to end the chat session if the chat session is a private session. However, the user may not be able to end the chat session if the chat session is a group session or a public session. Alternatively, the chat session can automatically end 214 if the chat session is valid for only a predetermined period of time.

Exemplary steps tor generating a live control link are illustrated in FIG. 8. Optionally, the model can generate a live control link via the link generator 123 (FIGS. 1, 2 and 5). If the model generates a live control link, the model can define the control parameters (e.g., amount of time a user can control the model toy) as indicated in block 215. Once the control parameters are defined, the link generator generates a live control link 216 via the server 106 (FIGS. 1, 2 and 5). The link generator may automatically cancel or invalidate previously generated links so that only valid links can be activated 217. Alternatively, the link generator may create a queue if more than one live control links is distributed to multiple users 217. The generated links are transmitted to users 218 via various messaging systems, for example, by email. The live control link can be configured to be clicked so as to control the adult toy 103 and can be used while the user is in a chat session (i.e., a private session, a group session, or a public session) or when the user is not in a chat session.

Figure 9:
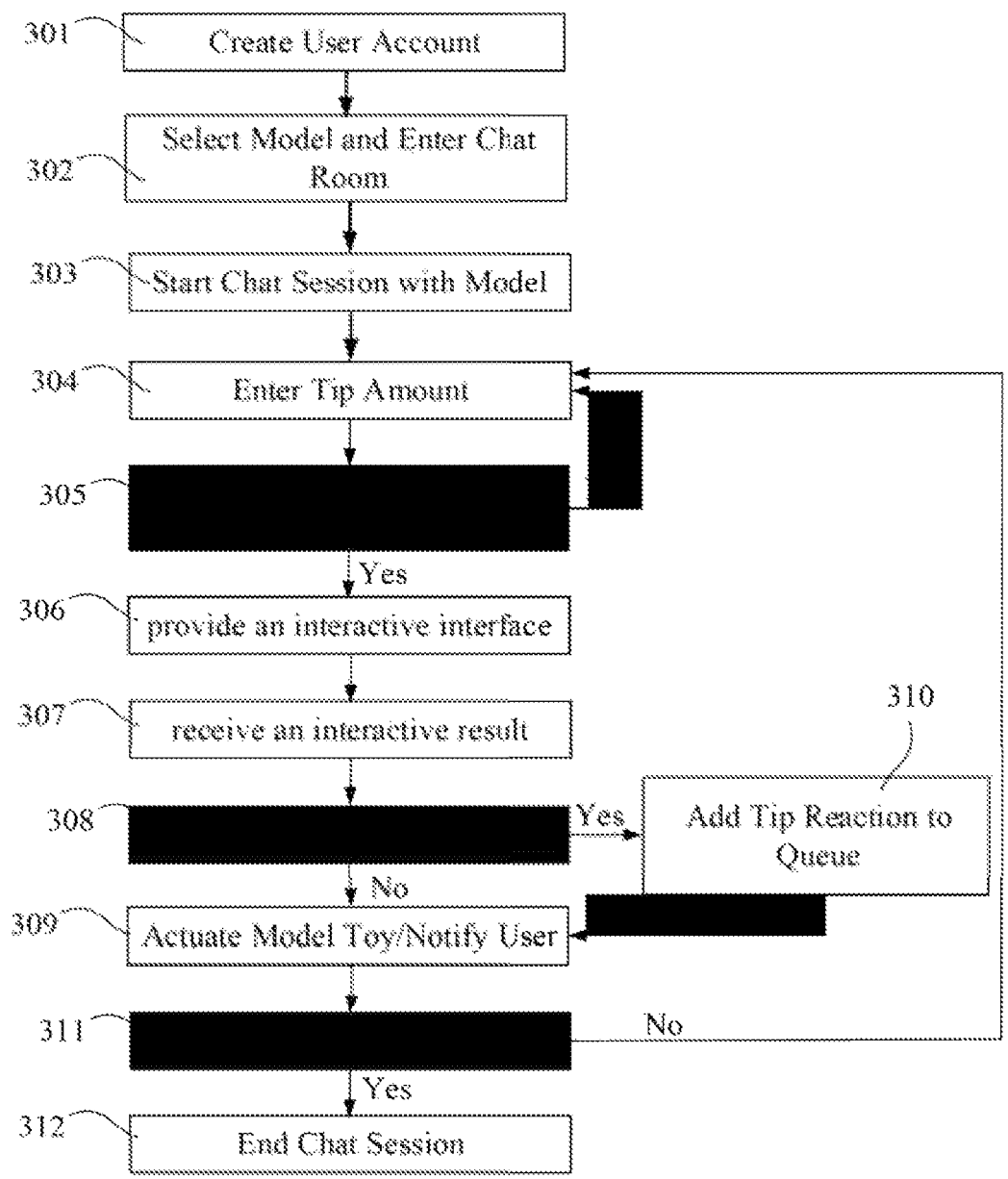

Another embodiment for the present method in operation is illustrated in FIG. 9. As indicated in block 301, the method further includes creating a user or a client account via a website 104 (FIGS. 1, 2 and 5), wherein the user account includes user name and password and input payment information, among other types of information associated with the user. As indicated in block 302, the user can select a model from a group of models to enter into a chat session and then begin a chat session with a model 303, wherein the chat session can be private, group, or public. Additionally, it is noted that one or more users may already be in a chat room, the chat room can be empty, or the model and the user can enter the chat room simultaneously.

As indicated in block 304, the user can enter a tip amount via the UI 113 (FIGS. 1, 2 and 5) of the website 104 (FIGS. 1, 2 and 5) during the chat session, tor example, by typing in the amount of tip within a conversation thread, or by selecting a tip amount from a drop down menu. In some embodiments, the model's input parameters may be made available to the user during the chat session so that the user can view the input parameters and tip the model accordingly. In some embodiments, the user can tip the model anonymously, for example, during a group session. As indicated in block 305, the web browser extension 118 or the website 104 (FIGS. 1, 2 and 5) determines whether the user paid the correct lip amount (i.e., a tip amount that falls within one of the input parameters defined by the model). If the user did not tip the correct amount, the web browser extension 118 (FIGS. 1, 2 and 5) can optionally notify the user to adjust the tip amount. Alternatively, the web browser extension 118 may not take any actions until the correct tip amount is input.

As indicated in blocks 306 and 307, if the correct tip amount is inputted, the web browser extension 118 (FIG. 1) or the website 104 controls the model device 115 provide an interactive interface, and then an interactive result from the interactive interface is received, the web browser extension 118 (FIG. 1), the website 104 or the model device 115 determines whether there is an existing queue 308. As indicated in block 309, if there is no existing queue, the web browser extension 118 determines the corresponding predetermined act based on the interactive result and actuates the Wi-Fi-enabled 120 (FIG. 1) model toy 103 (FIG. 1) or the web bowser extension 118 or the website 104 signals the application 105 (FIG. 2) to actuate the model toy 103 (FIG. 2). If there is an existing queue, the web browser extension 118 (FIG. 1) adds an reaction corresponding to the interactive result to queue 310. The user can continue chatting with the model and tip the model until the end of the chat session 311. In this regard, either the user and/or the model can end the chat session 312, or the chat session may be automatically ended after a predetermined period of time.

Figure 10:
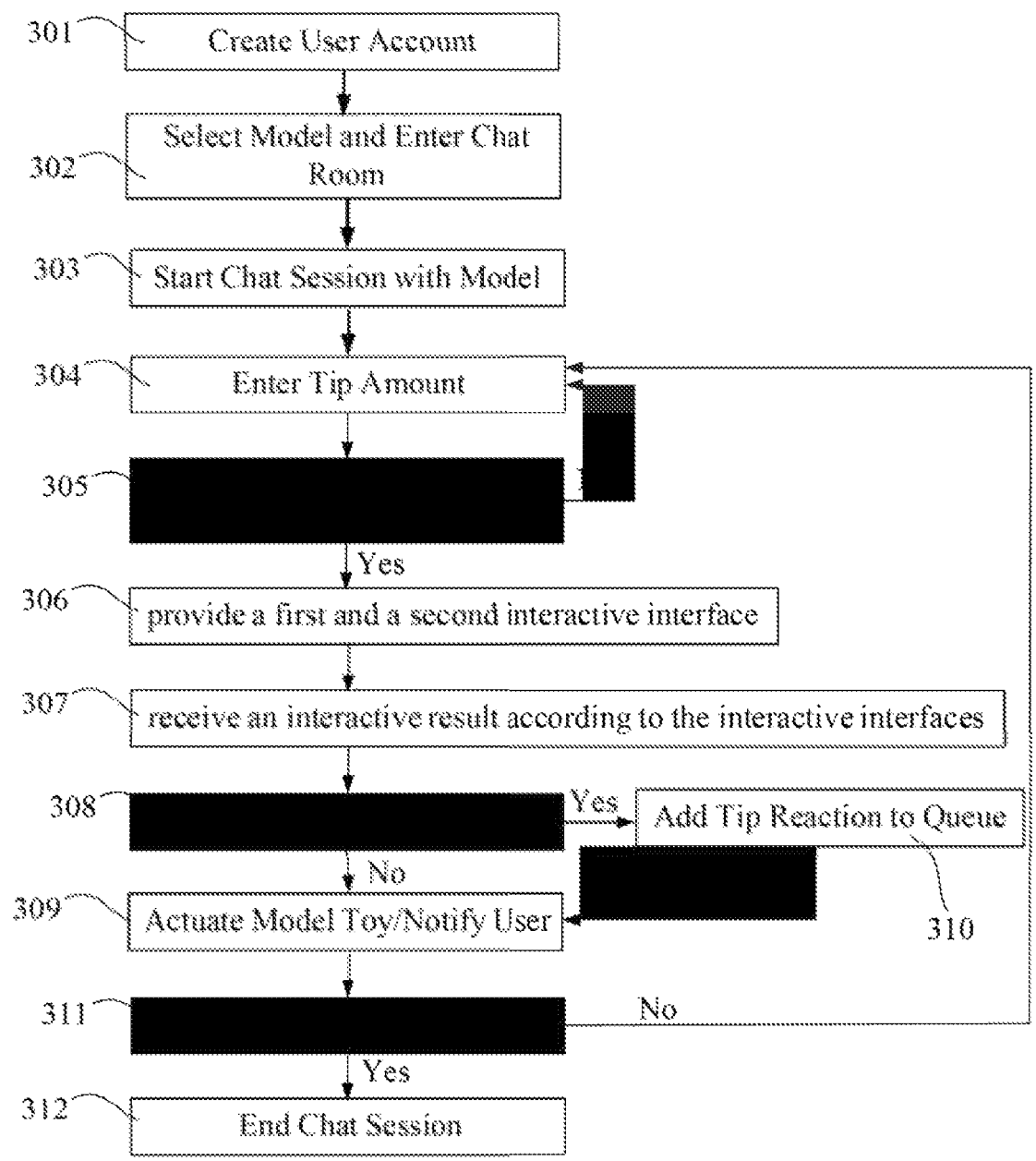
Figure 11:
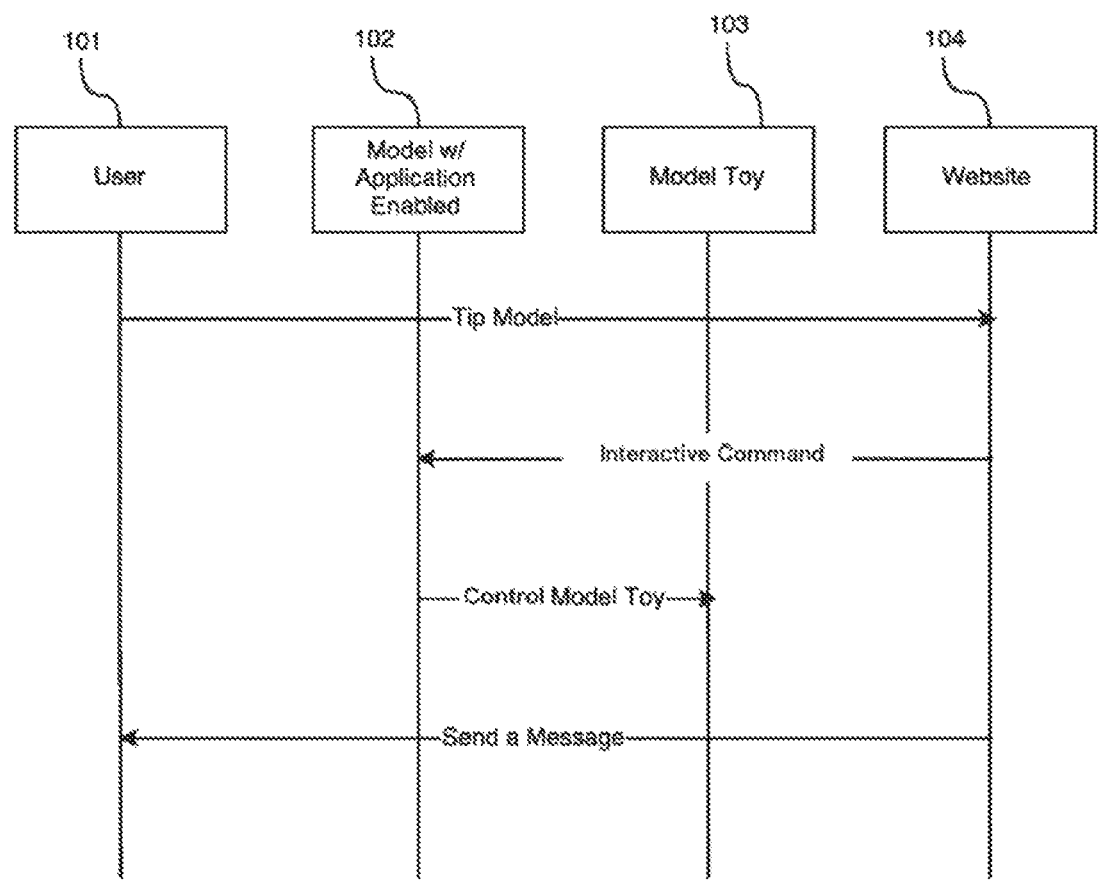
FIGS. 11 through 16 show exemplary diagrams of various embodiments of the present invention.
Figure 12:
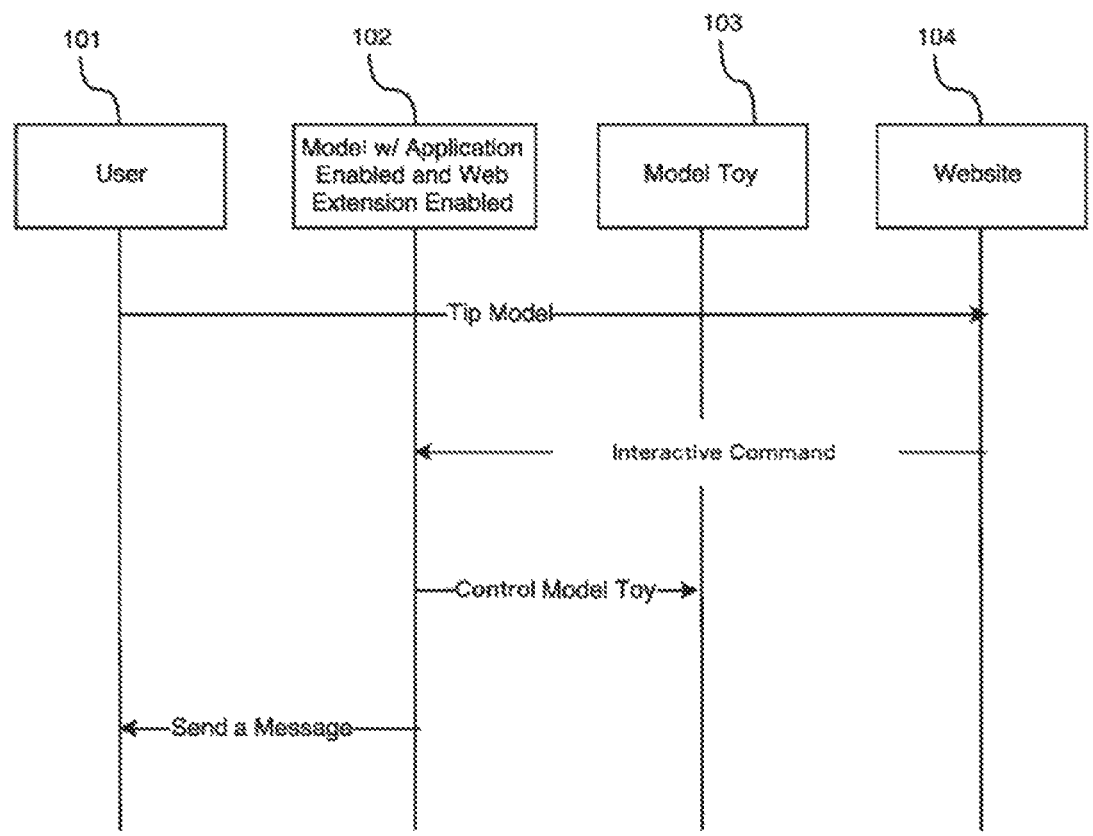
Figure 13:
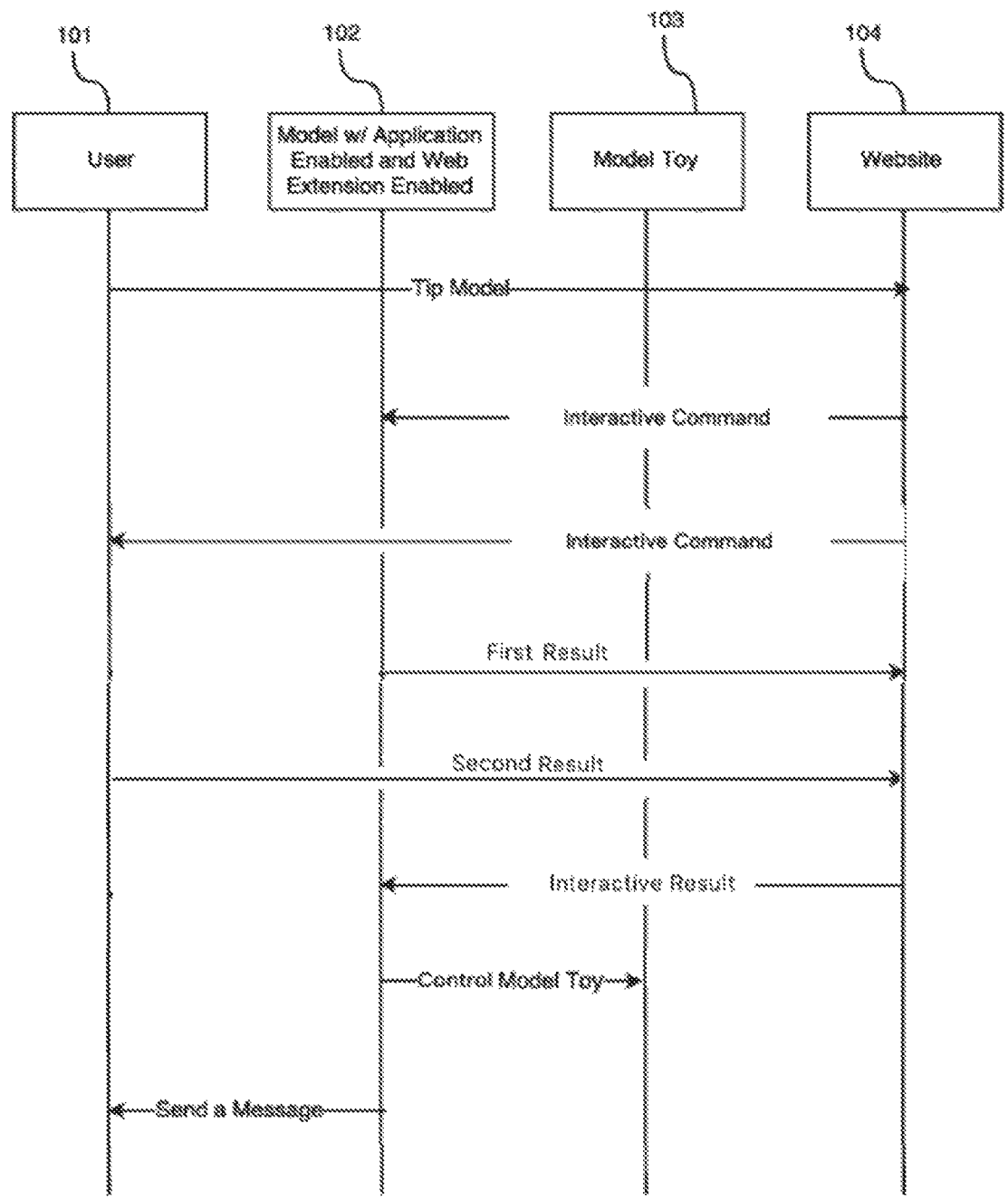
Figure 14:
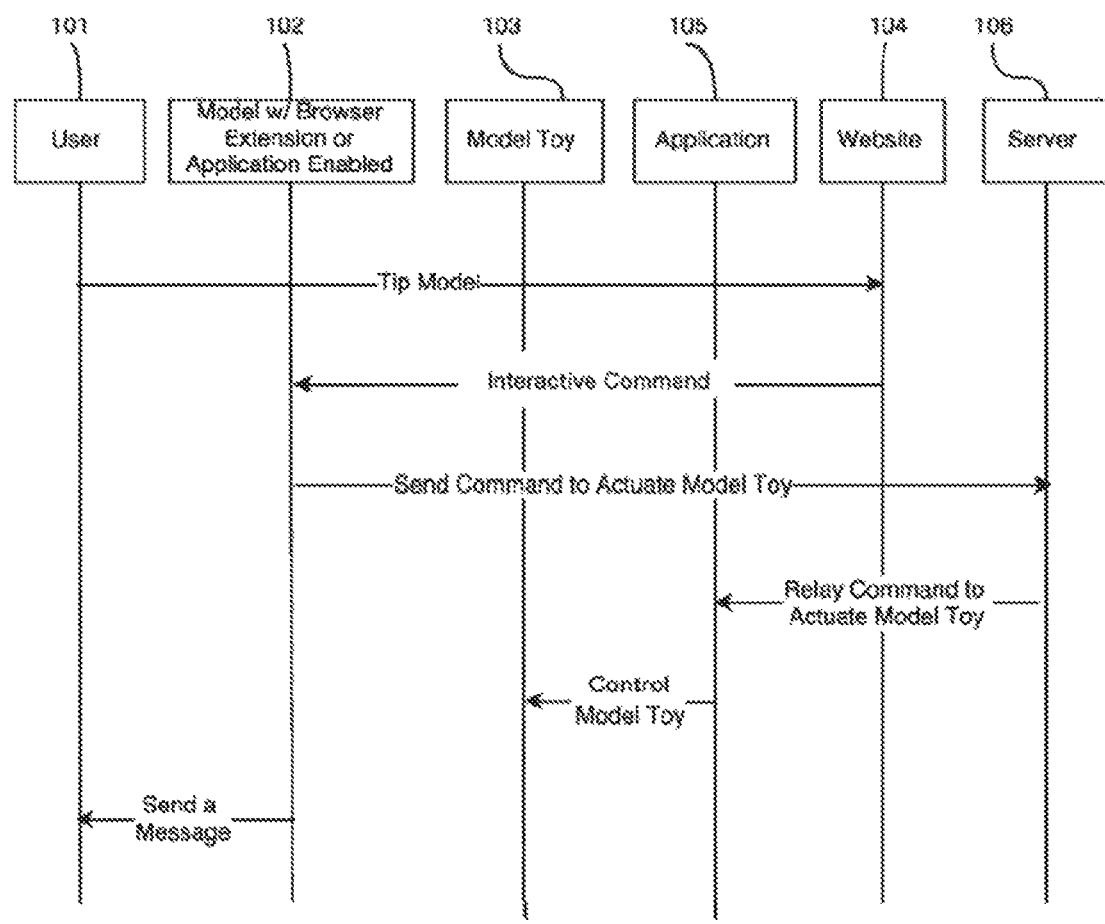
Figure 15:
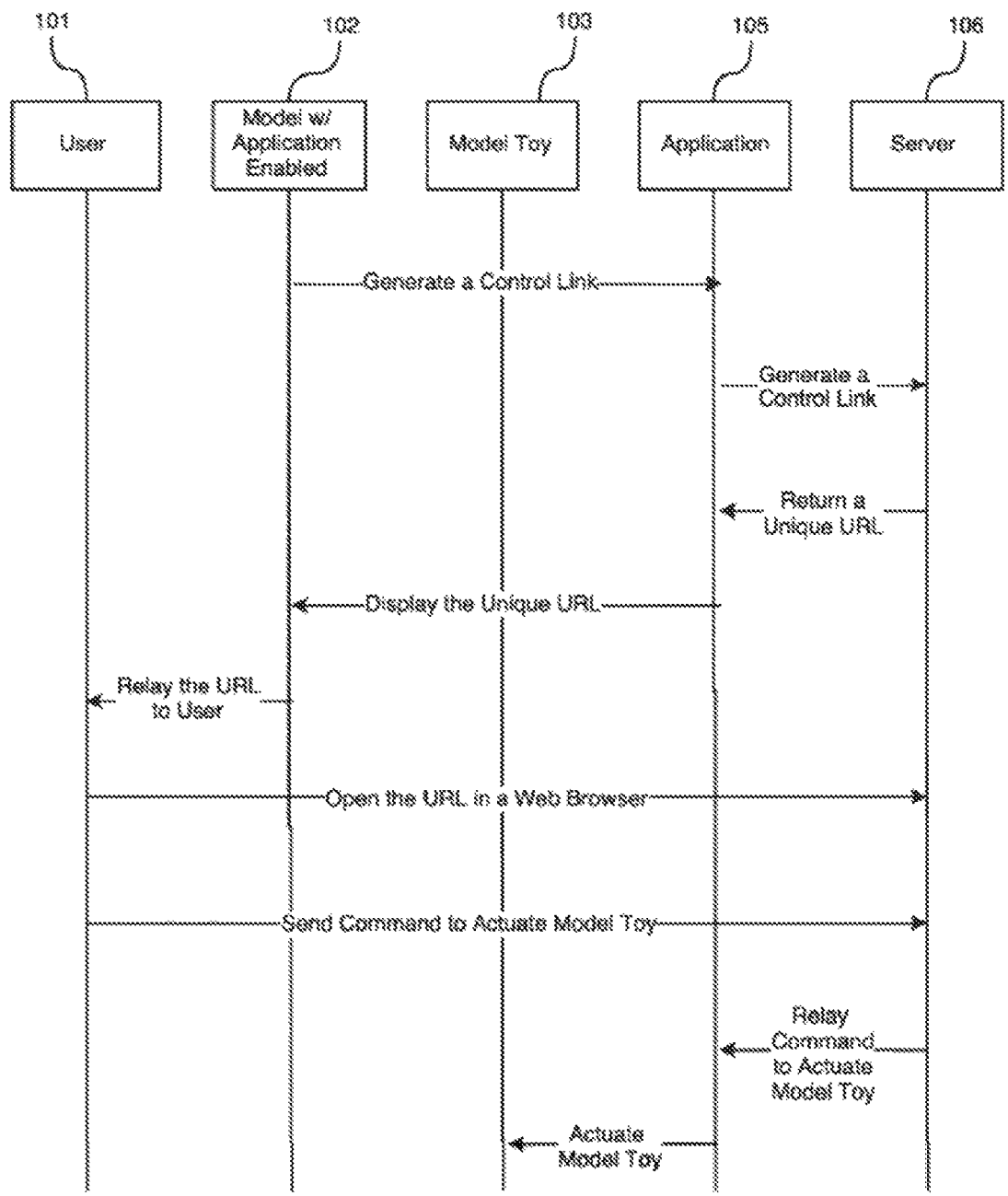
Figure 16:
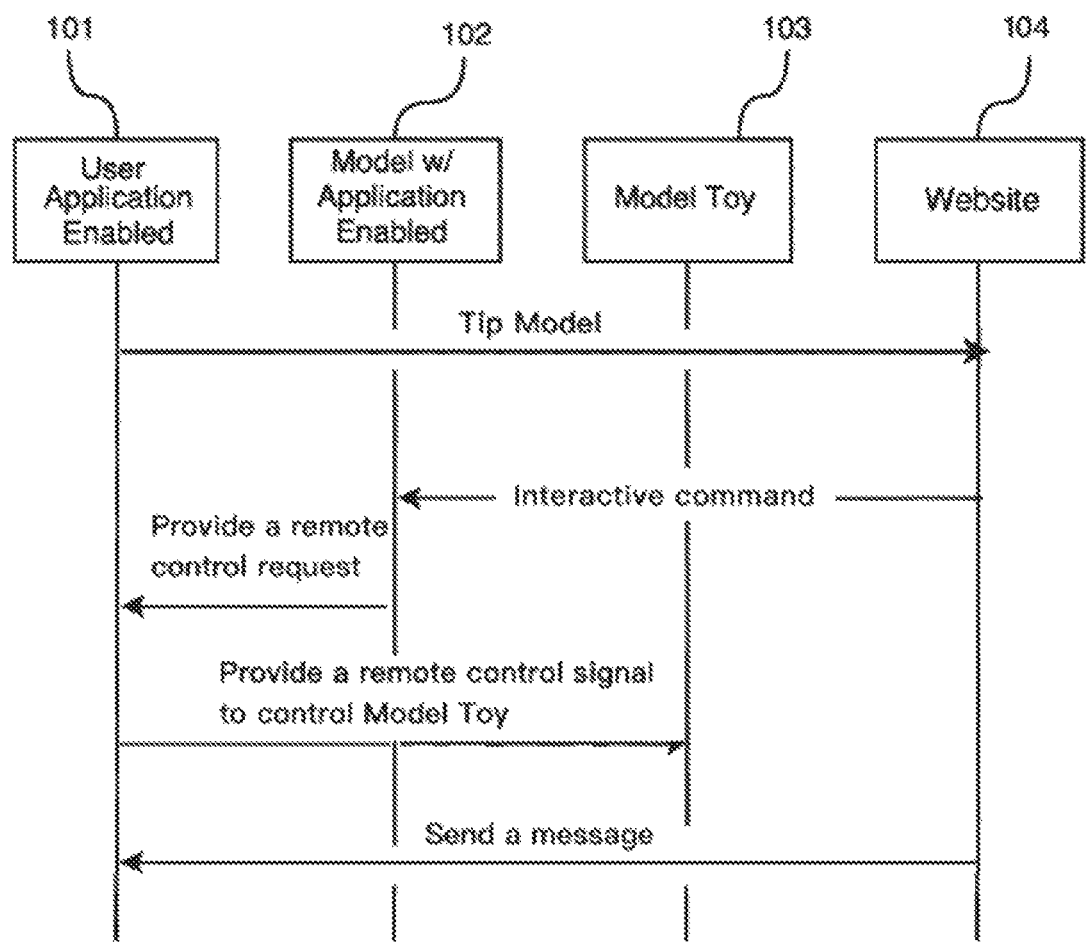

Another embodiment for the present method in operation is illustrated in FIG. 10. As indicated in block 301, the method further includes creating a user or a client account via a website 104 (FIGS. 1, 2 and 5), wherein the user account includes user name and password and input payment information, among other types of information associated with the user. As indicated in block 302, the user can select a model from a group of models to enter into a chat session and then begin a chat session with a model 303, wherein the chat session can be private, group, or public. Additionally, it is noted that one or more users may already be in a chat room, the chat room can be empty, or the model and the user can enter the chat room simultaneously.

As indicated in block 304, the user can enter a tip amount via the UI 113 (FIGS. 1, 2 and 5) of the website 104 (FIGS. 1, 2 and 5) during the chat session, for example, by typing in the amount of tip within a conversation thread, or by selecting a tip amount from a drop down menu. In some embodiments, the model's input parameters may be made available to the user during the chat session so that the user can view the input parameters and tip the model accordingly. In some embodiments, the user can tip the model anonymously, for example, during a group session. As indicated in block 305, the web browser extension 118 or the website 104 (FIGS. 1, 2 and 5) determines whether the user paid the correct tip amount (i.e., a tip amount that falls within one of the input parameters defined by the model). If the user did not tip the correct amount, the web browser extension 118 (FIGS. 1, 2 and 5) can optionally notify the user to adjust the tip amount. Alternatively, the web browser extension 118 may not take any actions until the correct tip amount is input.

As indicated in blocks 306' and 307', if the correct tip amount is inputted, the web browser extension 118 (FIG. 1) or the website 104 controls the model device 115 provide a first interactive interface and controls the user device 114 provide a second interface, and then an interactive result according to a first result from the first interactive interface and a second result from the second interactive interface is received, the web browser extension 118 (FIG. 1), the website 104 or the model device 115 determines whether there is an existing queue 308. As indicated in block 309, if there is no existing queue, the web browser extension 118 determines the corresponding predetermined act based on the interactive result and actuates the Wi-Fi-enabled 120 (FIG. 1) model toy 303 (FIG. 1) or the web browser extension 118 or the website 104 signals the application 105 (FIG. 2) to actuate the model toy 103 (FIG. 2). If there is an existing queue, the web browser extension 118 (FIG. 1) adds a reaction corresponding to the interactive result to queue 310. The user can continue chatting with the model and tip the model until the end of the chat session 311. In this regard, either the user and/or the model can end the chat session 312, or the chat session may be automatically ended after a predetermined period of time.

References are now made to FIGS. 11 through 16, which show exemplary diagrams of various embodiments of the present invention. In some embodiments, the user 101 can tip the model via the website 104, for example, by inputting the tip amount in a chat room. The model's UI 102 or the model toy 103 is notified of the tip via the web browser extension or the website. The website 104 provides an interactive interface or provides art interactive command to control the model's UI 102 provide an interactive interface. When the interactive result is generated from the interactive interface and the model toy 103 is actuated, the user 101 can receive an automated message via the website 104, wherein the message includes a thank you message or a predetermined message customized by the model 102. In other embodiments, the website 104 provides a first interactive interface and a second interactive interface or provides an interactive command to control the model's UI 102 provide a first interactive interface and the user 101 provide a second interactive interface. When an interactive result is generated by the website 104 according to a first result from the first interactive interface and a second result from the second interactive interface, and the model toy 103 is actuated according to the interactive result, the user 101 can receive an automated message via the website 104, wherein the message includes a thank you message or a predetermined message customized by the model 102.

In some embodiments, the model 102 may operate a model device having an application installed thereon, wherein the application is configured to automatically actuate the model toy 103 when it receives the interactive result.

In some embodiments, the present system further includes a server 106, wherein the model, via the application enabled on the model device, is configured to send command to the server 106 to actuate the model toy 103 according to the interactive result, and further wherein the server 106 is configured to relay the command to actuate the model toy 103. When the interactive result is received, the web browser extension is configured to send an automated message to the user 101 as described above.

In some embodiments, the model 102 can generate a live control link via the application 105, which triggers the server 106 to output a unique Uniform Resource Locator (URL) via the browser or the website and relay it back to the application 105 to display it on its UI. The model 102 can relay the URL (i.e., the live control link) to the user 101. The user can open the URL in a web browser and access a control panel to control the model toy. The user is not required to tip the model when using the control panel. When the user enters a command to actuate the model toy, the server 106 relays the command back to the application 105 in order to actuate the model toy.

In other embodiments, the model device 115 can provide a remote control request to the user device 114 according to the interactive result such that the user device 114 provides a remote control signal to control the adult toy 103 via the model device 115. It can be understood, the remote control request may be generated by a first application installed on the model device 115, the remote control request may be received by a second application installed on the model device 115, and the second application may provide the remote control signal to the for application so as to control the adult toy 103 via the model device 115.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention, further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A system for providing online communication, comprising:
   a user toy, operable by a user;
   an operable adult toy, operable by a model and configured to receive signals and/or to feed back signals;
   a memory having stored thereon instructions;
   at least one processor to execute said instructions resulting in a software application; said software application configured to:
   define input parameters;
   receive an input from one or more users; and
   providing at least one interactive interface, outputting randomly an interactive result according to the at least one interactive interface, receiving the interactive result and controlling said adult toy to move according to the interactive result, obtaining motion signals of the adult toy and feeding back the motion signals to the user toy; wherein the interactive result is obtained based on a first result output from one of the at least one interactive interface and a second result output from another one of the at least one interactive interface;
   wherein, the adult toy is controlled to move, based on the interactive result, to generate the motion signals; the user toy is configured to generate another motion signals, the motion signals generated by the user toy are configured to control the user toy to move, and the another motion signals generated by the user toy are configured to control the adult toy to move.

2. The system of claim 1, wherein the adult toy comprises one or more sensors through which the motion signals of the adult toy are obtained.

3. The system of claim 2, wherein the adult toy comprises a light-emitting member, and the motion signals are configured to control a light frequency of the light-emitting member.

4. The system of claim 2, wherein the adult toy further comprises a moving member and a camera module, and the interactive result is used to control movement of the moving member and switch on and/or off of the camera module.

5. The system of claim 4, wherein the adult toy further comprises a case with a hollow chamber and a lens arranged at a front end of the case, the camera module and the moving member are received in the chamber, the camera module is configured to take photos through the lens, and the moving member is configured to drive the case to move.

6. The system of claim 1, wherein said input parameters comprise one or more ranges of input value, said input comprises virtual currency, the software application is configured to determine whether said input falls within said one or more ranges;
   if said input fails within said input parameters, providing at least one interactive interface, outputting randomly an interactive result according to the at least one interactive interface, receiving the interactive result and controlling said adult toy to move according to the interactive result, receiving the motion signals of the adult toy and feeding back the motion signals.

7. The system of claim 1, wherein said adult toy is Wi-Fi-enabled or Bluetooth-enabled, the system further comprises a model device having an application installed thereon, wherein said application is configured to send commands to said adult toy to control said adult toy to move, and to obtain the motion signals of the adult toy and to feed back the motion signals.

8. The system of claim 7, wherein said model device is configured to provide the interactive interface, receive the interactive result from the interactive interface, control said adult toy to move according to the interactive result, obtain the motion signals of the adult toy and to feed back the motion signals.

9. The system of claim 1, wherein said software application comprises a link generator for generating a live control link according to the interactive result, said live control link configured to be clicked so as to control said adult toy to move, to obtain the motion signals of the adult toy and to feed back the motion signals, wherein said live control link comprises a unique Uniform Resource Locator (URL), said link generator is configured to invalidate previously generated live control link or to build a queue of multiple links.

10. A system for providing online communication, comprising:
    one or more user devices and a model device in connection with a network;
    each of said one or more user devices and said model device having a web browser thereon for accessing a website, said website providing an online chat room; an adult toy in communication with said model device;

one or more user toys in communication with the one or more user devices; said web browser comprising a software application, said software application configured to:
define input parameters, wherein said input parameters comprise one or more ranges of input value:
receive an input from said one or more users devices, wherein said input comprises virtual currency;
determine whether said input falls within said one or more ranges; and
if said input falls within said input parameters, providing an interactive command to at least one of said model device and said user device,
the at least one of said model device and said user device configured to provide an interactive interface according to the interactive command, outputting randomly an interactive result according to the interactive interface, receive the interactive result from the interactive interface and activate interaction between the model device and the one or more user devices providing the interactive interface;
wherein the interaction comprises:
obtaining first motion signals of the adult toy from the model device and second motion signals of the user toy from the user devices;
controlling the user toy to move according to the first motion signals; and
controlling the adult toy to move according to the second motion signals;
wherein, the adult toy further comprises a first moving member and a first camera module, movement of the first moving member and switch on and/or off of the first camera module are controlled according to the interactive result.

11. The system of claim 10, wherein the adult toy comprises one or more first sensors, through which the motion signals of the adult toy are obtained;
the user toy comprises one or more second signals, through which the motion signals of the user toy are obtained.

12. The system of claim 11, wherein the adult toy further comprises a first light-emitting member, the first motion signals are configured to control a light frequency of the first light-emitting member;
the user toy further comprises a second light-emitting member, the second motion signals are configured to control a light frequency of the second light-emitting member.

13. The system of claim 11, wherein
the user toy further comprises a second moving member and a second camera module, movement of the second moving, member and switch on and/or off of the second camera module are controlled according to the interactive result.

14. The system of claim 13, wherein the adult toy further comprises a first case with a first hollow chamber and a first lens arranged on a front end of the first case, the first camera module and the first moving member are received in the first hollow chamber, the first camera module is configured to take photos through the first lens, and the first moving member is configured to drive the first case to move;
the user toy further comprises a second case with a second hollow chamber and a second lens arranged on a from end of the second case, the second camera module and the second moving member are received in the second hollow chamber, the second camera module is configured to take photos through the second lens, and the second moving member is configured to drive the second case to move.

15. The system of claim 10, wherein if said input falls within said input parameters, said web browser provides the interactive command to the model device, said model device provides the interactive interface according to the interactive command and outputs randomly the interactive result according to the interactive interface, said web browser receives the interactive result from the interactive interface and activate interaction between the model device and Use user device providing the user interface.

16. The system of claim 10, wherein if said input falls within said input parameters, said web browser provides the interactive command to said model device and said user device, said model device provides a first interactive interlace according to the interactive command and outputs randomly a first result according to the first interactive interface, said user device provides a second interactive interface according to the interactive command and outputs randomly a second result according to the second interactive interface, said web browser outputs randomly the interactive result according to the first result and the second result and activate interaction between the model device and the user device providing the user interface according to the interactive result.

17. The system of claim 10, wherein said input parameters comprise a first range of input value, a second range of input value, and a third range of input value, the input value of the second range are greater than the input value of the first range and less than the input value of the third range,
if said input falls within said input parameters of the first range, the at least one interactive interface provides a first online game from the group of the finger guessing game, the dice game and the lottery game;
if said input falls within said input parameters of the second range, the at least one interactive interface provides a second online game from the group of the finger guessing game, the dice game and the lottery game; and
if said input falls within said input parameters of the third range, the at least one interactive interface provides a third online game from the group of the finger guessing game, the dice game and the lottery game.

18. The system of claim 17, wherein one of said model device and said website comprises a link generator for generating a live control link according to the interactive result, said live control link configured to be clicked so as to activate interaction between the model device and the user device providing the user interface, further wherein said live control link comprises a unique Uniform Resource Locator (URL), said link generator is configured to invalidate previously generated live control link or to build a queue of multiple links.

19. The system of claim 10, wherein said model device is also configured to provide a remote control request to the user device such that the user device provides a remote control signal to activate interaction between the model device and the user device providing the user interface via said model device.

20. A system for providing online communication, comprising:
an operable adult toy configured to receive signals and/or to feed back signals;
a memory having stored thereon instructions;

at least one processor to execute said instructions resulting in a software application; said software application configured to:
define input parameters;
receive an input from one or more users; and
providing at least one interactive interface, outputting randomly an interactive result according to the at least one interactive interface, receiving the interactive result and controlling said adult toy to move according to the interactive result, obtaining motion signals of the adult toy and feeding back the motion signals;
wherein the adult toy comprises one or more sensors through which the motion signals of the adult toy are obtained; and
wherein the adult toy further comprises a moving member and a camera module, and the interactive result is used to control movement of the moving member and switch on and/or off of the camera module.

* * * * *